US012605950B2

(12) United States Patent
Franco Morera et al.

(10) Patent No.: US 12,605,950 B2
(45) Date of Patent: Apr. 21, 2026

(54) MEDIA WEB TENSIONING

(71) Applicant: Hewlett-Packard Development Company, L.P., Spring, TX (US)

(72) Inventors: Albert Franco Morera, Sant Cugat del Valles (ES); Alberto Arredondo Rosales, Sant Cugat del Valles (ES); Cara Ellen Birschbach, Sant Cugat del Valles (ES); Fernando Rey Arrieta, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 192 days.

(21) Appl. No.: 18/557,640

(22) PCT Filed: Apr. 30, 2021

(86) PCT No.: PCT/US2021/030109

§ 371 (c)(1),
(2) Date: Oct. 27, 2023

(87) PCT Pub. No.: WO2022/231614

PCT Pub. Date: Nov. 3, 2022

(65) Prior Publication Data

US 2024/0208253 A1 Jun. 27, 2024

(51) Int. Cl.
*B41J 15/16* (2006.01)
*B65H 23/04* (2006.01)

(52) U.S. Cl.
CPC .............. *B41J 15/16* (2013.01); *B65H 23/04* (2013.01); *B65H 2401/21* (2013.01); *B65H 2405/58* (2013.01); *B65H 2515/10* (2013.01); *B65H 2515/31* (2013.01); *B65H 2801/03* (2013.01)

(58) Field of Classification Search
CPC ...... B41J 15/16; B65H 23/04; B65H 2405/58; B65H 2515/10; B65H 2515/31; B65H 2801/03; B65H 2801/06
See application file for complete search history.

(56) References Cited

U.S. PATENT DOCUMENTS 5,307,579 A 5/1994 Clayton et al.
6,457,410 B1 10/2002 Zerillo
7,373,697 B2 * 5/2008 Moyer ................ B42F 15/0011 24/67 R (Continued)

FOREIGN PATENT DOCUMENTS

JP 2008063139 A * 3/2008
JP 6204186 B2 * 9/2017

(Continued)

*Primary Examiner* — Christle I Marshall
(74) *Attorney, Agent, or Firm* — Jordan IP Law, LLC

(57) ABSTRACT

A system (300) is provided having a printer (4) to print ink onto a web (6) of media (8). The system (300) has a winding roller (10) on which to roll the web (6) of media (8) after printing. A tensioner (12) to vary the tension in a portion (14) of the web (6) of media (8) is also provided. The portion (14) is a portion of web which is being rolled onto the winding roller (10). Also provided is controller (16) to control the tensioner (12) to vary the tension based on the time taken for the printed ink on the web (6) of media (8) to dry.

14 Claims, 6 Drawing Sheets

(56) References Cited

U.S. PATENT DOCUMENTS

| | | | | |
|---|---|---|---|---|
| 8,137,016 | B2 * | 3/2012 | Dobkin | B41J 15/165<br>28/240 |
| 8,777,501 | B2 * | 7/2014 | Garcia | B65H 23/00<br>400/613.1 |
| 9,776,437 | B2 * | 10/2017 | Gracia Verdugo | B65H 19/28 |
| 9,776,438 | B2 | 10/2017 | Ruiz Floriach et al. | |
| 9,981,820 | B2 * | 5/2018 | Yuan | B41J 11/001 |
| 10,059,134 | B2 * | 8/2018 | Akahane | B41J 15/16 |
| 10,370,216 | B2 | 8/2019 | Ando et al. | |
| 2009/0297244 | A1 * | 12/2009 | Hatada | B41J 15/04<br>400/582 |
| 2010/0005986 | A1 | 1/2010 | Sato et al. | |
| 2010/0260529 | A1 | 10/2010 | Dobkin et al. | |
| 2012/0288315 | A1 | 11/2012 | Garcia et al. | |
| 2014/0037357 | A1 * | 2/2014 | Castelles | B41J 13/22<br>400/617 |
| 2015/0274484 | A1 * | 10/2015 | Shinjo | B65H 19/28<br>242/579 |
| 2016/0094752 | A1 | 3/2016 | Asaka et al. | |
| 2018/0088509 | A1 | 3/2018 | Musete et al. | |
| 2020/0376864 | A1 * | 12/2020 | Kobayashi | B41J 11/0095 |

FOREIGN PATENT DOCUMENTS

| | | | |
|---|---|---|---|
| JP | 2020-104269 | A | 7/2020 |
| KR | 10-2002-0001443 | A | 1/2002 |
| RU | 14203 | U1 | 7/2000 |
| SU | 16222 | A1 | 8/1930 |
| SU | 48107 | A1 | 8/1936 |
| SU | 101558 | A1 | 11/1954 |

* cited by examiner

MEDIA WEB TENSIONING

BACKGROUND

Web-fed printing systems are commonplace and can be found, for example, in industrial or retail printing environments. Web-fed refers to the webs, or rolls, of media, being fed into the printing devices and are distinguishable from sheet-fed printers. Sheet-fed refers to individual sheets of media being fed into the printing device. The media can include paper, polymeric materials, or other media adapted for printing. Sheet-fed printing devices offer the advantages of being configurable for different format sizes and waste sheets can be reused for testing, which can lead to flexibility and lower cost print preparation. Web-fed printing devices, however, provide much faster printing than sheet-fed devices. The speed of web-fed printing devices makes them ideal for large runs such as newspapers, magazines, and books.

The output from a web-fed printing device can be cut into sheets and collated for use in newspapers, for example. Alternatively, the output can be retained in web form and rolled on to a winding roller rather than cut into sheets. The printed media may then be stored as a roll or web of media for subsequent processing, for example, cutting into sheets.

DESCRIPTION

In most web-fed printing systems, it is beneficial to maintain the media under tension while it is being printed thereby ensuring an appropriate media path and reducing errors such as, e.g., skew or media buckling that drastically reduces the image quality on printed media. It is hereby disclosed a printing system that allows for having tensioned media at the vicinity of the leading edge of the media, thereby reducing the media waste that would require taking the media to a tensioning roller, e.g., an output roller downstream the print zone.

Therefore, it is hereby disclosed a tensioning device for use in a printing system, the tensioning device comprising a clamping mechanism to fix the tensioning device to a leading edge of a web of media and a weight to provide a tension to the printed web of media. In an example, the weight is to be suspended as to provide a tension to the media.

In an example, the clamping device fix the device to the web of media by a magnetic clamping mechanism. The magnetic clamping mechanism is to be understood as a mechanism that comprises magnets and being to, in use, provide a pressure to the web of media thereby fixing the media and the tensioning device.

In addition, the device may, in an example, comprise an intermediate section between the clamping device and the weight, wherein the intermediate section has a length that is at least a print zone length of the printing system.

In a further example, the intermediate section may comprise a fabric and, moreover, may have a length of between 0.5 m and 1 m. In particular, the intermediate section may have a length of about 700 mm or, at least, the length of the print zone.

In a further example, the tensioning device may comprise a coupling to receive a series of additional weights. Therefore, the tensioning device may apply different levels of tension depending on the weight or the number of weights to use.

In an example implementation, the weight is displaceable in a direction parallel to the width of the web of media.

Therefore, the device may be balanced as to accommodate a uniform tension across the media. In a further example, the clamping mechanism spans the width of the printed web of media thereby ensuring that the media is receiving a tension along its entire width.

Moreover, the weight may span the width of the printed web of media and has a substantially uniform mass along the width of the printed web of media.

It is also hereby disclosed a printing system comprising:

an input roller to receive a web of media;

a print engine having an associated print zone, the print engine receiving the web of media;

a tensioning device detachably attached by a clamp to a leading edge of the printed web of media wherein the tensioning device comprises a weight such that the weight, by gravity, causes a tension on the web of media.

In an example, the tensioning device is attached to the leading edge by a magnetic clamp, i.e., a magnetic clamping mechanism.

Also, the tensioning device may comprise an intermediate section interposed between the clamp and the weight. Such intermedia section may be a fabric and, in an example, may have a length that is longer than the length of the print zone.

In an example, the system further comprises an output roller, being to output roller to receive the leading edge of the media once the tensioning device is detached from the leading edge.

It is furthermore hereby disclosed a printing method wherein the method comprises feeding a media from a media web in a feeding direction of a printing system until a leading edge of the media passes through a print zone;

clamping a tensioning device having a weight to the leading edge of the media wherein the weight is provided such that gravity tensions the web of media;

printing a media length associated to a print job;

unclamping the tensioning device from the leading edge of the media and attaching the leading edge to an output roller; and printing the remainder of the print job with the output roller tensioning the web of media.

In an example, the method comprises after clamping the tensioning device to the leading edge of the media, returning the media in a direction opposite to the feeding direction so that the leading edge is positioned within the print zone. opposite to the feeding direction so that the leading edge is positioned within the print zone.

Some non-limiting examples of the present disclosure will be described in the following with reference to the appended drawings in which.

In the following description and figures, some example implementations of print apparatus, print systems, and/or methods of printing are described. In examples described herein, a "print apparatus" may be a device to print content on a physical medium (e.g., paper, textiles, a layer of powder-based build material, etc.) with a print material (e.g., ink or toner). For example, the print apparatus may be a wide-format print apparatus that prints latex-based print fluid on a print medium, such as a print medium that is size A2 or larger. In some examples, the physical medium printed on may be a web roll. A print apparatus may utilize suitable print consumables, such as ink, toner, fluids or powders, or other raw materials for printing. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

Furthermore, for the purpose of explanation, numerous specific details of certain examples are set forth. Reference in the specification to 'an example' or similar language means that a particular feature, structure, or characteristic described in connection with the examples is included in at least that one example, but not necessarily in other examples.

Figure 1:
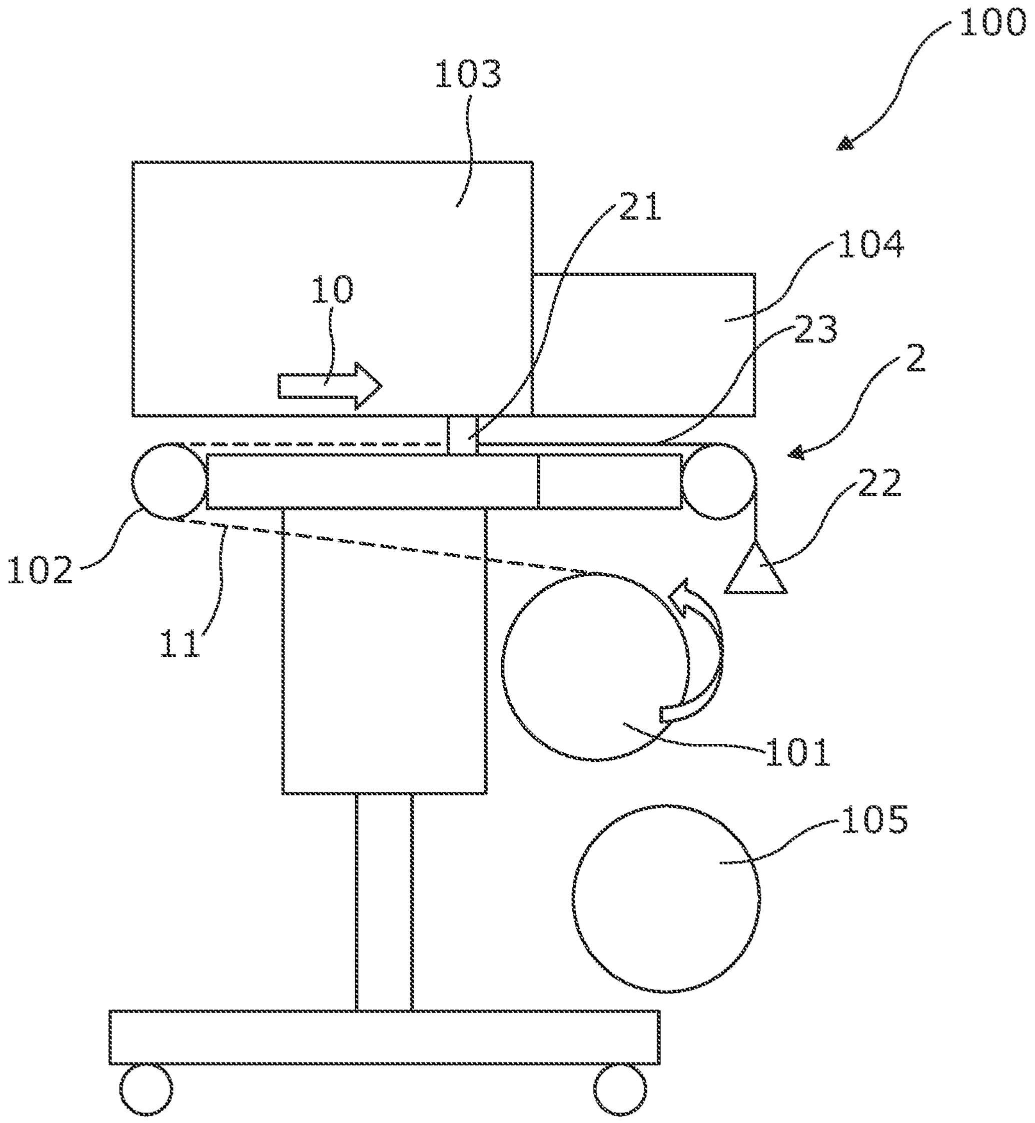
FIG. 1 is a schematic view of a printing system in accordance with an example.

In the example shown in FIG. 1 a printing system 100 is depicted, the printing system 100 having an input roller 101 that is to receive a web of media 11. The web of media 11 is coupled to an advance roller 102 which has the function of pulling media from the input roller 101 as to feed the print engine 103 with media 11 so that the print engine 103 comprises a plurality of fluid ejection devices 10 that eject printing fluid onto the media 11 thereby printing images onto the media 11. The zone in which the fluid ejection devices 10 eject printing fluid towards the media 11 is considered to be a print zone (PZ).

In an example the fluid ejection devices comprise a nozzle for ejecting printing fluid and an actuator to force the printing fluid through the nozzle.

Some printing systems may also comprise a post-processing unit 104 wherein the printed media is post-processed as to provide a quality finish, in some examples, the post-processing unit 104 may comprise a drying unit, a heating unit, a curing unit and/or a sublimation unit wherein the main objective of these units is to enhance to printing fluid-to-media interaction and adhesion to ensure that the print job originally sent to the user is accurately reflected in the printed media.

During a printing operation, it is highly beneficial to maintain the media with a certain tension as to prevent image quality issues. Such tension is normally dependent on the type of media to be used and the print mode, e.g., the ink density to be used during the printing operation. The output roller 105 may aid in providing such tension to the media 11 during printing but, in that case, the media 11 located between the print zone and the output roller would not be printed and has to be considered as waste material.

The present invention provides for a tensioning device 2 that is attached to the leading edge of the media 11 as to provide a tension that would allow the printing system 100 to execute a printing operation in the vicinity of the leading edge, thereby reducing the amount of media waste.

In particular, the media 11 would be advanced, e.g., by the advance roller 102 from the input roller 101 thereby moving the input roller 101 in an unwinding direction (UW) through the print zone to a zone in which a user may couple the tensioning mechanism 2 to the media, in particular, the user may fix the tensioning device 2 to the media 11 by a clamping mechanism 21 i.e., a clamp which may be a spring-based clamp or, in an example, a magnetic clamping mechanism. By unwinding direction (UW) it should be understood as the direction in which the media is unwound from a media roll, i.e., media 11 is removed from the roll.

In an example, the media 11 would be advanced to a position downstream the print zone in which the user may be able to clamp the tensioning device 2 in a safe manner.

The tensioning device 2 also comprises a mass or weight 22 separated from the clamping mechanism 21 by an intermediate section 23 that may be made of a material, e.g., comprising a fabric. The intermediate section is to provide an extension on the tensioning device so that the weight hangs from the printing system and, by gravity, exerts a tension on the media 11 thereby allowing the printing system to perform a printing operation while the media is kept under a predefined tension which is dependent on the weight. In some examples, the weight may be replaced depending on the type of media to be printed or the particularities of each printing operation, for example, additional weights may be added to the tensioning device 2 to increase the tension provided on the media.

Figure 2A:
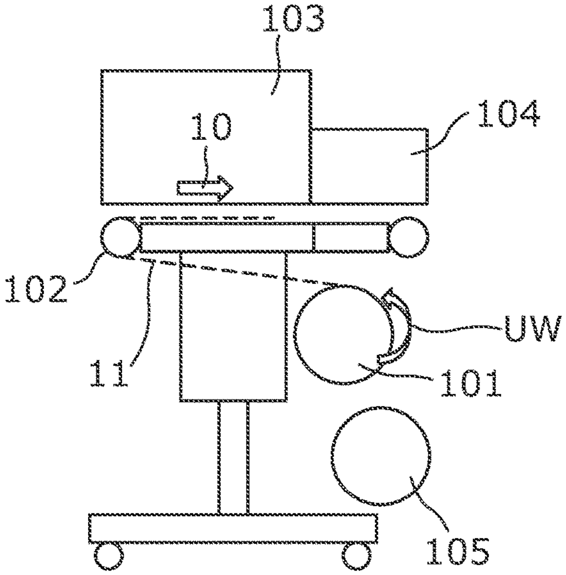
FIGS. 2A-2D are schematic drawings illustrating a printing method with a tensioning device according to an example.

FIGS. 2A-2D illustrate a printing method using a tensioning device and a printing system as disclosed in the present invention. FIG. 2A discloses feeding a leading edge of a media 11 from the input roller 101 through the print zone (PZ) to a location in which the user may have access to the media 11. While feeding the media 11, the input roller rotates in its unwind direction (UW) to advance the media 11 downstream the print zone (PZ).

Figure 2B:
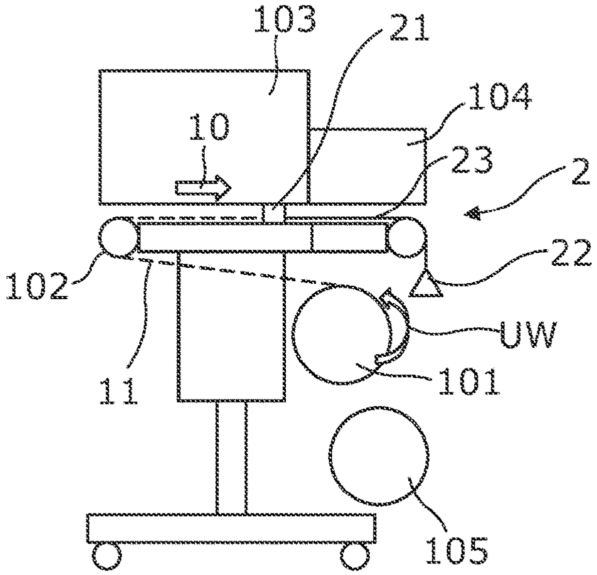

FIG. 2B shows that once the media 11 is in a position downstream the print zone (PZ), in particular, the leading edge of the media, a tensioning mechanism 2 is fixed to the media 11. The leading edge of the media 11 is considered as the first portion of the media, for example, the initial 5 cm of media 11 and, in a further example, the initial 2 cm of media.

The tensioning mechanism is, in an example, fixed to the leading edge of the media 11 by a clamping mechanism which may be a spring-loaded clamp or, in another example, may be a magnetic clamping mechanism wherein a magnet in conjunction with a metal (or another magnet with opposite polarity) are located on opposing sides of the media 11 thereby causing a clamping effect that fixes the tensioning mechanism 2 to the media 11.

Once the tensioning device 2 is attached to the media 11, the media is subject to a tensioning force caused by gravity and dependent on the weight used in the tensioning device 2. In an example, the weight 22 of the tensioning device 2 is interchangeable so that the user may select the weight to use depending on the characteristics of the media 11 and/or the print mode to be used.

Figure 2C:
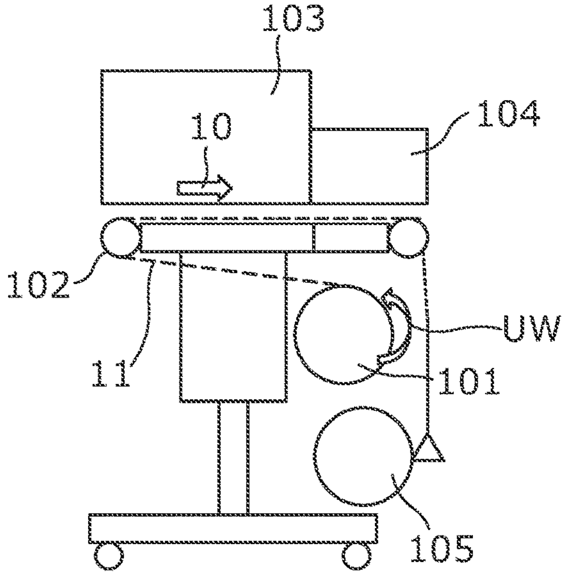

FIG. 2C shows that, once the tensioning device 2 has been attached to the media 11, in particular, to the leading edge of the media 11, the printing system may start processing and printing a print job. The tensioning device 2 maintains a determined tension which should be sufficient to maintain the image quality of the printing system while avoiding the media waste given that, otherwise, the media 11 would have to be taken to the output roller 105 to provide the tension needed to print with adequate image quality.

In an alternative example (not shown), once the tensioning device 2 has been fixed to the media 11, the printing system 100 may return the leading edge of the media 11 towards the print zone, e.g., by rotating the input roller in a winding direction opposite to the unwinding direction (UW) thereby collecting media 11 and reducing, even more, media waste as it would allow to print closer to the leading edge of the media. 11.

The printing system may print jobs (or part of a print job) for a pre-determined length of media, for example, the user may pre-set that the printing system may print for a longitude until the weight approximates the floor or a printer surface with the tensioning device 2 being attached to the media 11. In an alternative mode of operation, the user may visually determine that the printed media has enough longitude to couple the media 11 to the output roller 105 and, therefore, use the output roller 105 as a tensioning mechanism while collecting the media 11 that has been printed.

As disclosed above, the longitude of the media 11 to be printed using the tensioning device 2 may optionally be pre-set by the user or may be manually set. In an alternative embodiment, the printer may comprise detecting means for determining a decrease in the media tension that may be caused by the weight reaching the floor and, therefore, pause a printing operation until the user couples the media to further tensioning means, e.g., the output roller 105.

Figure 2D:
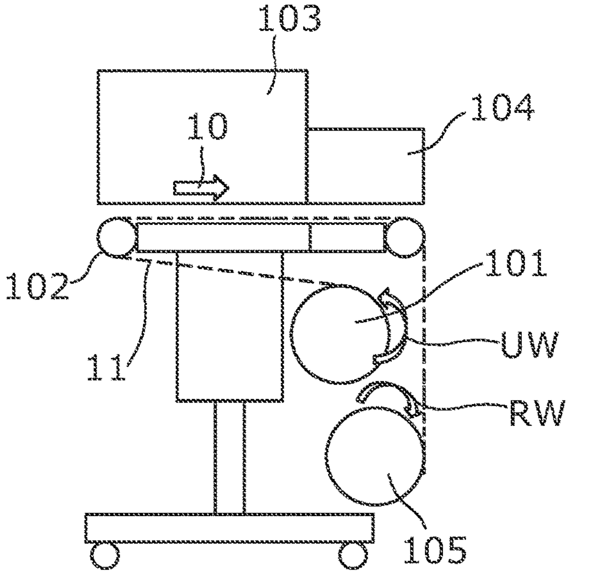

As illustrated in FIG. 2D, once it has been determined that the media 11 reaches the output roller 105, the user may couple the media 11 to the output roller 105 so that a rotation in the rewind direction (RW) of the output roller collects media 11 and generates a tension therein. The rewind direction is to be understood as a direction in which the media is collected by the output roller 105.

Figure 3A:
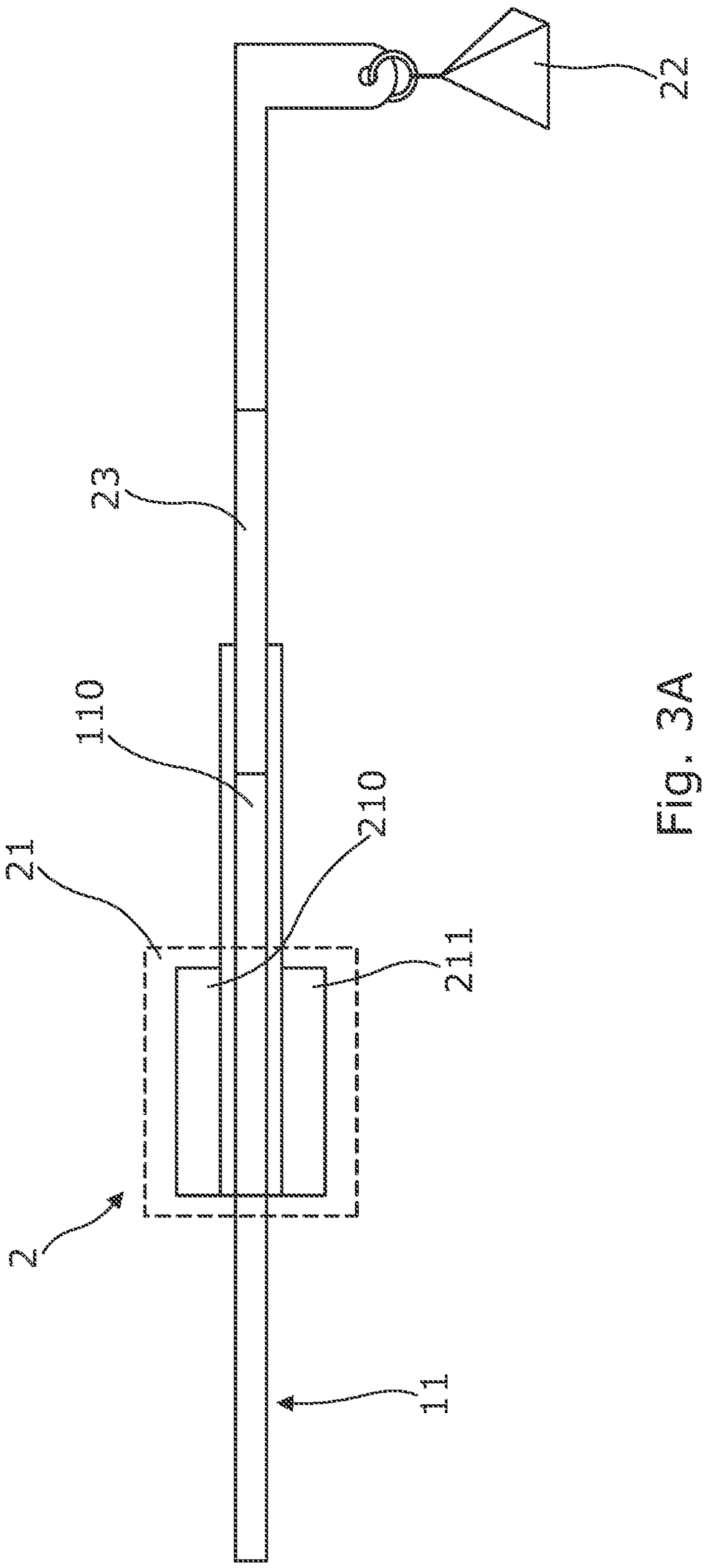
FIG. 3A is a schematic diagram showing a tensioning device according to an example.

FIG. 3A shows an example of a schematic cross-section illustrating a tensioning device 2 for attachment to a media 11. In particular, the tensioning device is detachably attached to the leading edge 110 of the media 11 by a clamping mechanism. In an example, the clamping mechanism may be any mechanism in which an upper portion 210 located on an upper side of the media interacts with a lower portion 211 exert a force towards each other, thereby pressing the media 11 between them.

In an example, the clamping mechanism is a spring-based clamp in which the upper portion 210 is pressed against the lower portion 211 by a spring-like element.

In a further example, the clamping mechanism is a magnetic clamping mechanism. In this case one of the upper portion 210 or the lower portion 211 comprises a magnet and the other one of the upper portion 210 or the lower portion 211 comprises a metal or a further magnet with opposing polarity. In this manner, the upper portion and the lower portion are biased towards each other and, upon a presence of a media 11 between them, exert a pressing force thereby attaching the clamping mechanism (and, in consequence, the tensioning device 2) to the media 11.

Further, the tensioning device 2 comprises an intermediate section 23 between the clamping mechanism 21 and the weight 22 that acts as a spacer allowing to place the weight away from support structures of the media 11 so that it is suspended to tension the media 11. In an example, the length of the intermediate element is between 0.5 and 1 meter or, in an example about 700 mm, and, in a further example, is at least the length of the print zone (PZ).

In some examples, the weight 22 is attached to the intermediate element by coupling means that allow for its detachment and allow replacement of the weight by a different one, e.g., having a different shape or size or even adding additional weights to the tensioning device. In examples, the weight may have a size so that it spans the width of the media as to provide a substantially uniform tension along its width, also, the coupling between the weight and the intermediate element may span, at least, the width of the media.

Figure 3B:
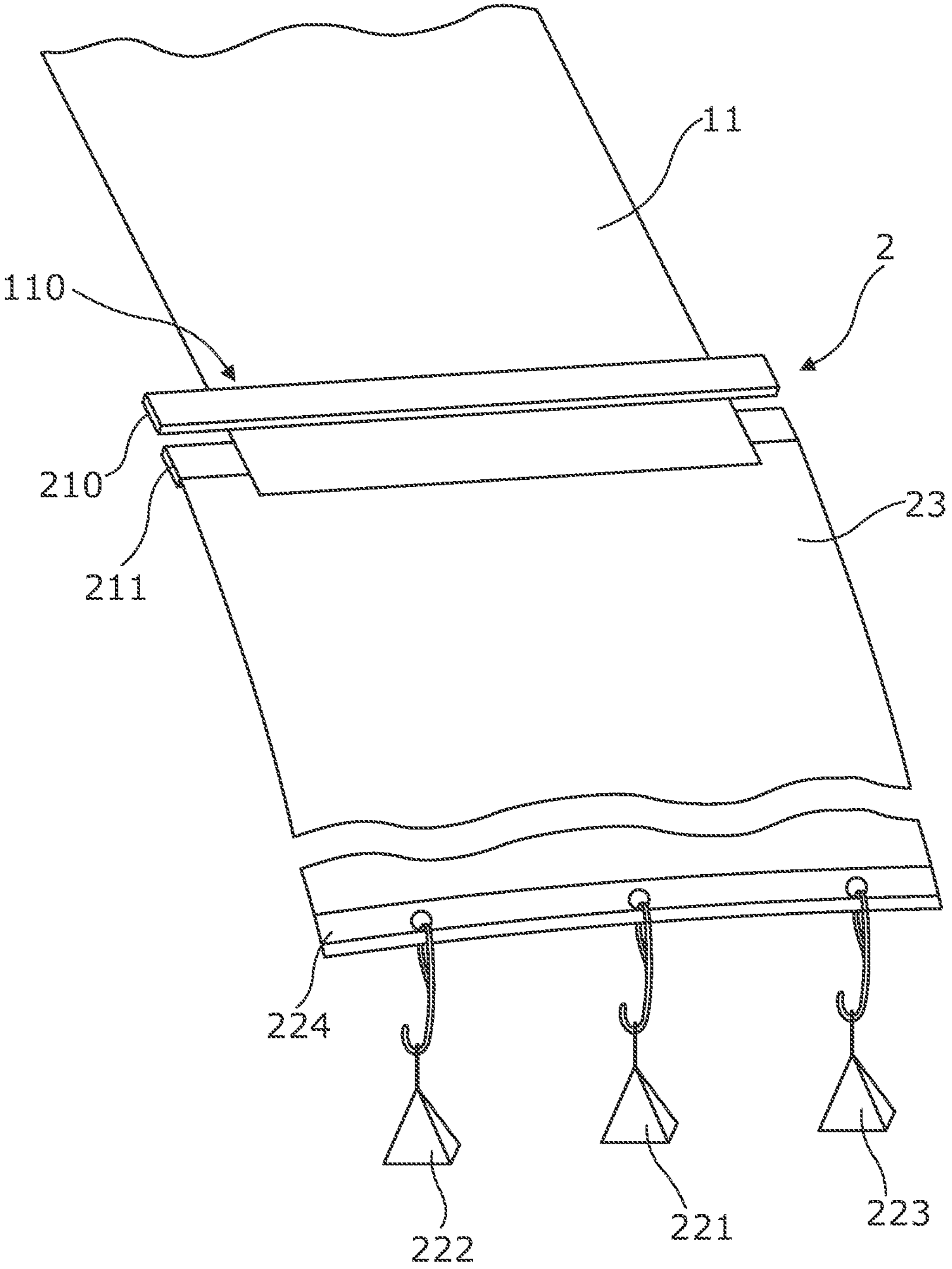
FIG. 3B is a schematic isometric view of a tensioning device according to an example.
Figure 3C:
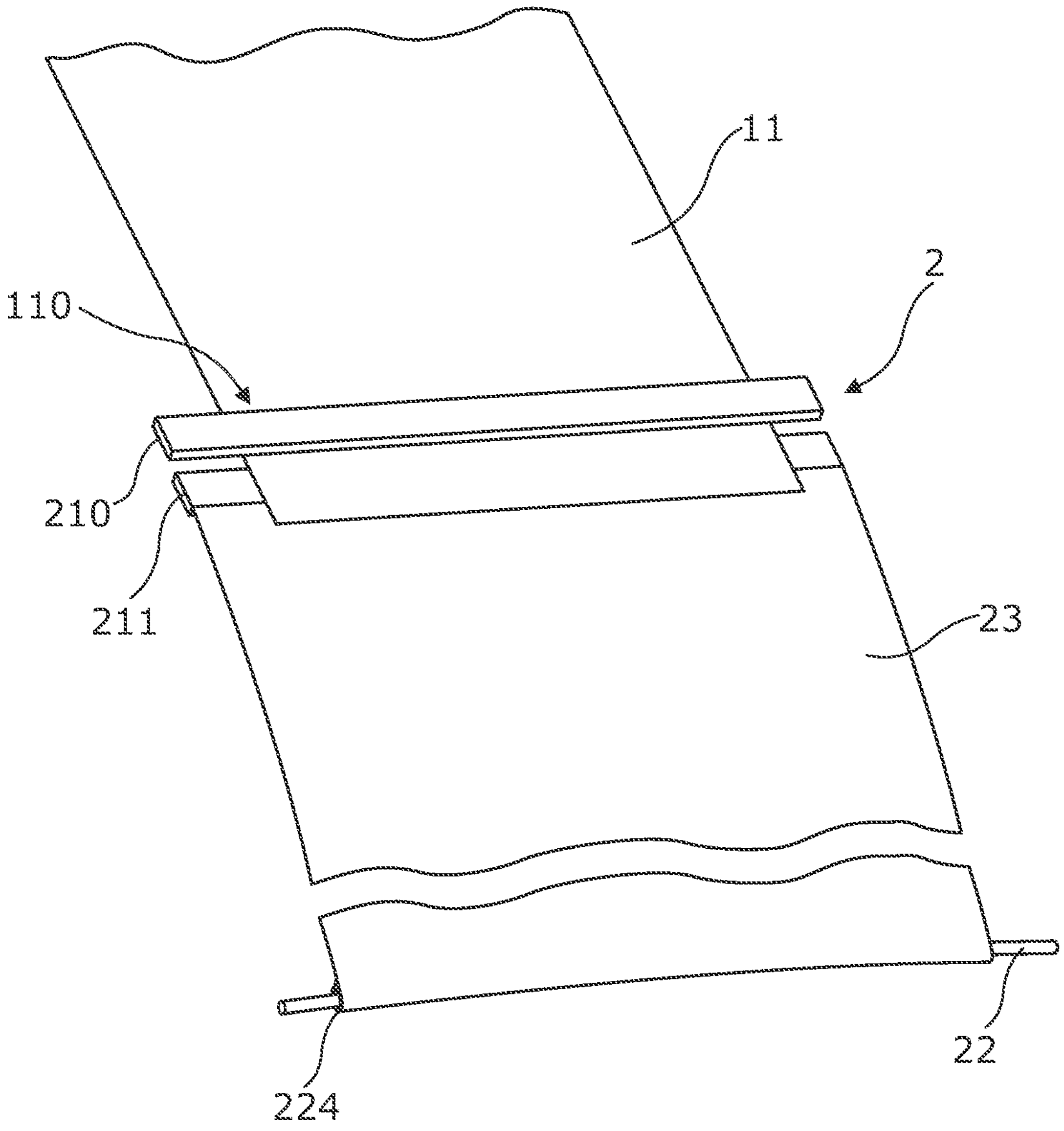
FIG. 3C is a schematic isometric view of a tensioning device according to a further example.

FIGS. 3B and 3C shows a schematic views examples of tensioning devices while being used with a media 11. In this example, the leading edge 110 of the media 11 is fixed by a pressing force exerted by a clamping mechanism that comprises an upper portion 210 and a lower portion 21 that, in these cases, is due to magnetism, therefore, the clamping mechanism is considered to be a magnetic clamping mechanism.

In the example of FIG. 3B, the intermediate section 23 is fixedly coupled to one of the portions, in particular the lower portion 211 and the weights 221, 222, 223 are attached to a weight-holding element 224 which, in this case, comprises a plurality of rings to accommodate a hook associated to each weight. In an example, the weight-holding element 224 may be movable along the width of the media as to balance the tensions exerted thereon.

FIG. 3C illustrates an alternative weight-holding element 224 in which the weight 22 is within a loop that acts as a support for the weight, the loop acting as a weight-holding element.

Figure 4:
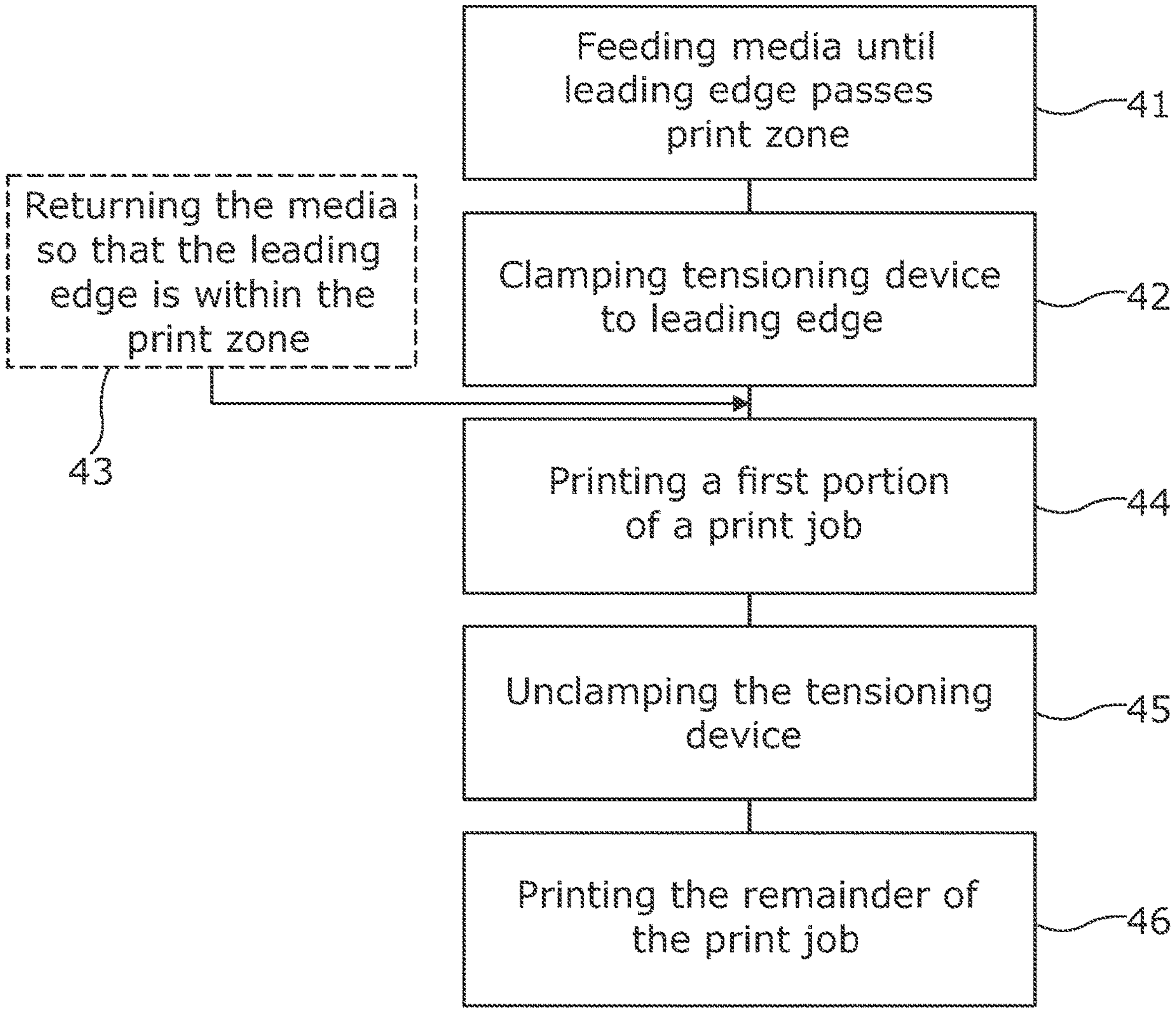
FIG. 4 is a flowchart of a printing method according to an example.

FIG. 4 shows a flowchart disclosing a printing method according to an example. In particular, the method of FIG. 4 comprises feeding media 41 until the leading edge passes the print zone and is in a position in which the user may safely fix the leading edge of the media to a tensioning device. Subsequently, the user clamps the tensioning the device to the leading edge 42, in an example, the weight is to be positioned so that it is suspended as to tension the media due to the gravity effect on the weight.

As an optional step, the printing system may be to return the media 43 so that the leading edge is position within the print zone or upstream the print zone so that the printing system may start printing closer to the leading edge, thereby further reducing media waste. This action may be performed, e.g., by rotating an input roller in a rewind direction, i.e., in a direction in which media is collected on the media roll.

Then, the printing system may start printing a first portion of a print job 44. For example, the printing system may be set to print a determined length of media, e.g., a length calculated so that the printed media is enough to reach an output roller. In other examples, the printing system may be to assess the tension applied on the media and, if the tension lowers below a threshold, it may be considered that the weight is not providing enough tension and the printing operation may be halted.

Finally, the user may unclamp the tensioning device 45 and couple the media to a further tensioning mechanism such as, e.g., the output roller and print the remainder of the print job 46.

Without further analysis, the foregoing so fully reveals the gist of the present inventive concepts that others can, by applying current knowledge, readily adapt it for various applications without omitting features that, from the standpoint of prior art, fairly constitute the characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

The invention claimed is:

1. A tensioning device for use in a printing system, the tensioning device comprising a clamping mechanism to fix the tensioning device to a leading edge of a web of media and a weight to provide a tension to the printed web of media, wherein the weight spans the width of the printed web of media.

2. The tensioning device of claim 1, wherein the clamping device fix the device to the web of media by a magnetic clamping mechanism.

3. The tensioning device of claim 1 wherein the device comprises an intermediate section between the clamping device and the weight, wherein the intermediate section has a length that is at least a print zone length of the printing system.

4. The tensioning device of claim 3 wherein the intermediate section has a length of between 0.5 m and 1 m.

5. The tensioning device of claim 1, further comprising a coupling to receive a series of additional weights.

6. The tensioning device of claim 1, wherein the weight is displaceable in a direction parallel to the width of the web of media.

7. The tensioning device of claim 1, wherein the clamping mechanism spans the width of the printed web of media.

8. The tensioning device of claim 1, wherein the has a substantially uniform mass along the width of the printed web of media.

9. A printing system comprising:

an input roller to receive a web of media;

a print engine having an associated print zone, the print engine receiving the web of media;

a tensioning device detachably attached by a clamp to a leading edge of the printed web of media wherein the tensioning device comprises a weight such that the weight, by gravity, causes a tension on the web of media, wherein the weight spans the width of the printed web of media.

10. The system of claim 9, wherein the tensioning device is attached to the leading edge by a magnetic clamp.

11. The system of claim 9, wherein the tensioning device comprises an intermediate section interposed between the clamp and the weight.

12. The system of claim 11, wherein the intermediate section has a length that is longer than the length of the print zone.

13. A printing method wherein the method comprises:

feeding a media from a media web in a feeding direction of a printing system until a leading edge of the media passes through a print zone;

clamping a tensioning device having a weight to the leading edge of the media wherein the weight is provided such that gravity tensions the web of media;

printing a media length associated to a print job;

unclamping the tensioning device from the leading edge of the media and attaching the leading edge to an output roller; and printing the remainder of the print job with the output roller tensioning the web of media, wherein the weight or a clamping mechanism that holds the weight spans the width of the printed web of media.

14. The method of claim 13 wherein the method comprises, after clamping the tensioning device to the leading edge of the media, returning the media in a direction opposite to the feeding direction so that the leading edge is positioned within the print zone.

* * * * *